United States Patent
Babka et al.

(10) Patent No.: US 7,747,945 B1
(45) Date of Patent: Jun. 29, 2010

(54) DATA VALIDATION RULES FOR ACORD DOCUMENTS

(75) Inventors: James Babka, Austin, TX (US); Alvin Richardson, Austin, TX (US); Matthew Sanchez, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1227 days.

(21) Appl. No.: 11/232,835

(22) Filed: Sep. 22, 2005

Related U.S. Application Data (60) Provisional application No. 60/612,139, filed on Sep. 22, 2004.

(51) Int. Cl.
*G06F 17/00* (2006.01)
(52) U.S. Cl. .............................. 715/237; 715/234; 705/4
(58) Field of Classification Search ................. 715/234, 715/237, 221; 705/4
See application file for complete search history.

(56) References Cited

U.S. PATENT DOCUMENTS

| | | | |
|---|---|---|---|
| 6,928,487 B2 * | 8/2005 | Eggebraaten et al. | 709/246 |
| 7,130,862 B2 * | 10/2006 | Easton | 707/102 |
| 7,257,647 B2 * | 8/2007 | Katz et al. | 709/246 |
| 7,315,841 B1 * | 1/2008 | McDonald et al. | 705/38 |
| 7,333,939 B1 * | 2/2008 | Stender et al. | 705/4 |
| 7,340,435 B2 * | 3/2008 | McDonald et al. | 705/38 |
| 7,451,394 B2 * | 11/2008 | Perla et al. | 715/234 |
| 2001/0047326 A1 * | 11/2001 | Broadbent et al. | 705/38 |
| 2002/0178112 A1 * | 11/2002 | Goeller et al. | 705/39 |
| 2004/0003400 A1 * | 1/2004 | Carney et al. | 725/42 |
| 2004/0073870 A1 * | 4/2004 | Fuh et al. | 715/513 |
| 2004/0186750 A1 * | 9/2004 | Surbey et al. | 705/4 |
| 2005/0050000 A1 * | 3/2005 | Kwok et al. | 707/1 |
| 2005/0268223 A1 * | 12/2005 | Hanson et al. | 715/513 |
| 2006/0004729 A1 * | 1/2006 | Zhilyaev et al. | 707/3 |
| 2006/0041838 A1 * | 2/2006 | Khan | 715/513 |
| 2006/0136274 A1 * | 6/2006 | Olivier et al. | 705/4 |
| 2007/0022093 A1 * | 1/2007 | Wyatt et al. | 707/2 |

OTHER PUBLICATIONS http://web.archive.org/web/20040209144829/http://groovy.codehaus.org/.*

* cited by examiner

*Primary Examiner*—Doug Hutton
*Assistant Examiner*—Benjamin J Smith
(74) *Attorney, Agent, or Firm*—Stevens & Showalter LLP (57) ABSTRACT

A validation system is provided for validating the general structure of XML documents, for example ACORD documents, with a schema validation engine and a schema, for example an ACORD schema. A rules profile, containing a carrier's rules for ACORD documents, is set up and stored in storage. A rules engine further validates a received ACORD document with the rules contained in the rules profile. For efficient coding, the rules engine uses a combination of a scripting language (Groovy—which is the standard scripting language for Java) and dot notation to describe exactly how the levels of the ACORD document are to be traversed, so that a single expression (that looks like a long variable name) is used to directly access the data in the document. A programmer simply writes a single long variable name that specifies exactly the data needed and makes that data available to use during validation.

20 Claims, 6 Drawing Sheets

DATA VALIDATION RULES FOR ACORD DOCUMENTS

CROSS-REFERENCE TO RELATED APPLICATIONS

This application claims the benefit of PPA Ser. No. 60/612,139, filed Sep. 22, 2004 by the present inventors.

FIELD OF THE INVENTION

This innovation relates to methods that validate XML documents according to compliance rules governing structure and content.

BACKGROUND OF THE INVENTION

For speed of communications and cost effectiveness, individuals, businesses, and other organizations frequently exchange electronic data through e-mail, the Internet, and other networks and systems. Companies increasingly rely on third-party applications on the Internet to accomplish a wide range of intended purposes, often involving the exchange of electronic documents. XML (Extensible Markup Language) is a specification widely used for such exchanges of electronic documents.

Figure 1:
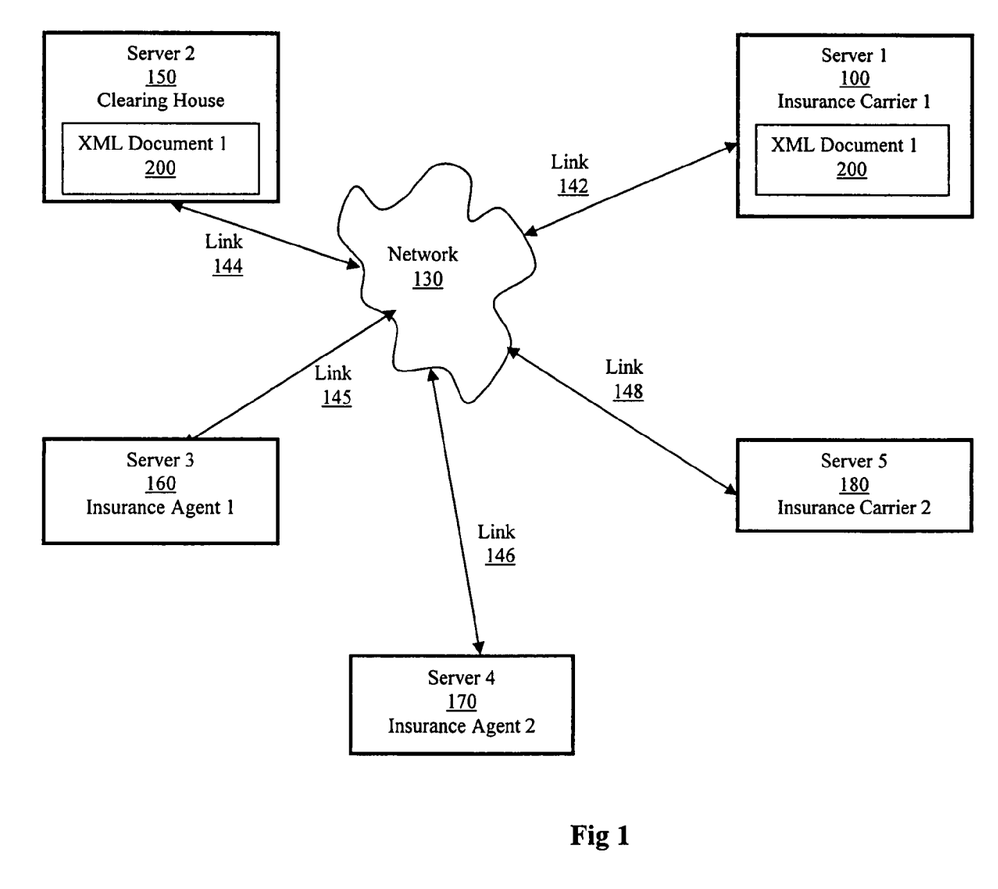
FIG. 1 is a block diagram showing a typical operating environment in which ACORD documents are communicated to carriers.

For example, business entities such as insurance agents often use third-party clearing houses to obtain information from carriers such as insurance companies. XML documents may be used for the exchange of this information among the parties. FIG. 1 illustrates an operating environment where insurance agent 1 at server 3 160 and insurance agent 2 at server 4 170 may employ a clearing house at server 2 150 to request insurance policy information for insurance carrier 1 at server 1 100 and insurance carrier 2 at server 2 180.

Server 100 can communicate with servers 150, 160, 170, and 180 via a wired or wireless link 142, a wired or wireless network 130, and wired or wireless links 144, 145, 146, and 148. The servers 100, 150, 160, 170, and 180 may be personal computers or larger computerized systems or combinations of systems.

The network 130 may be the Internet, a private LAN (Local Area Network), a wireless network, a TCP/IP (Transmission Control Protocol/Internet Protocol) network, or other communications system, and can comprise multiple elements such as gateways, routers, and switches. Links 142, 144, 145, 146, and 148 use technology appropriate for communications with network 130.

For example, insurance agent 1 at server 3 160 may use the clearing house at server 2 150 to request information about the rate for insurance coverage for a potential client with certain characteristics from insurance carrier 1 at server 1 100. The clearing house at server 2 150 prepares an XML document 200 comprising a request for insurance rates for a client with those characteristics and sends XML document 200 to server 1 100.

Business entities may also submit requests directly to carriers without using a clearing house.

Such request documents for insurance industries, from whatever source, are often created in the ACORD format, which is a type of XML format developed by the Association for Cooperative Operations Research and Development (ACORD), a nonprofit insurance association whose mission is to facilitate the development and use of standards for the insurance, reinsurance and related financial services industries. In this specification, an XML document in accord format is referred to as an ACORD document.

Validation

Before processing an XML document 200, a carrier such as insurance carrier 1 at server 1 100 typically must validate that XML document 200 complies with that carrier's rules. For example, a carrier may require that a policy's identification number contain no more than seven digits. If the field for the policy's identification number in XML document 200 contains eight digits, the carrier will typically invalidate the request and return it to the sender for error correction and resubmission.

Prior Techniques for Validation

The task of validating the data contained within an ACORD document, which may contain hundreds of lines of code, can be quite complicated. Software tools such as XML Schema can be used to validate that the structure of an ACORD document is partially correct, but the capabilities of existing schema languages have significant limitations. Also, the actual data content causes another layer of complexity that has to this point required non-trivial manual coding effort.

The use of rules engines to perform these kinds of validations presents significant advantages to the techniques mentioned above. A rule is a specification of a condition and one or more consequences of that condition. This model lends itself well to doing many checks on data, such as are done in validation. Because conditions can be expressions of arbitrary complexity, the limitations of existing schema languages can be easily overcome.

An important advantage of rules engines is that their rules can be adjusted and new rules introduced without the need for anything in the rules engines to be recompiled. As input, rules engines take data files representing sets of rules and interpret them against a set of data, which is a very efficient form for validation.

However, a rules engine still cannot process an ACORD document as efficiently as possible. One reason for this inefficiency is that a coding idiom must be supplied for the subroutine to work with the actual data. For example, consider the following XML fragment:

```
<XXX>
    <YYY>
        abc
    </YYY>
</XXX>
```

To get to the data item "abc", a programmer could construct an XPath query such as "XXX/YYY/child::text( )". But then the programmer would have to go into the resulting Node list, get the single Node representing the text node, and get the node value, before the validation of the data could begin. The Java code to do this would look like the following code (using Jaxen, an open source tool that supports XPath queries on XML documents, as an XPath tool):

DOMXPath xpath=new DOMXPath("XXX/YYY/child::text( )");

List nodes=xpath.selectNodes(document);

Node node=nodes.get(0);

String nodeValue=node.getNodeValue( );

In other words, after the four lines given above, the data "abc" is finally obtainable in the variable "NodeValue".

To make this code easier to use, a programmer could write a subroutine like the above code, but that would take a DOM Node and an XPath expression and return the string of the corresponding text node. However, that subroutine would need to be written somewhere other than in the rules themselves, and a class would need to be defined on which to specify the method. Even then the result of this effort would not yield something that fits easily with the way rules are written, as the following example shows:

```
<rule name="Policy Number Too Long">
    <parameter identifier="policy">
        <groovy:class>org.w3c.dom.Node</groovy:class>
    </parameter>
    <groovy:condition>XPathUtil.getString(document,
"//ACORD/YYY/child::text( )").length( )> 7</groovy:
    condition>
    <groovy:consequence>
        drools.assertObject(new com.webify.ValidationError
            ("TOO_LONG"))<
    </groovy:consequence>
</rule>
```

The major disadvantage of this technique is that it does not fit easily with the way rules are written. Every time a programmer wanted to access a data item in an ACORD document with this technique, he or she would have to write a Java-looking expression, resulting in the same lengthy character sequence for the condition of every rule.

Such a process is unnecessarily laborious, time consuming, and expensive. Therefore, there is a need for a method and system that provides a more efficient method to validate that ACORD documents comply with carriers' rules.

BRIEF SUMMARY OF THE INVENTION

These and other needs are addressed by the present invention. The following explanation describes the present invention by way of example and not by way of limitation.

In accordance with the present invention, an efficient validation system is provided for validating the general structure of XML documents, for example ACORD documents, with a schema validation engine and a schema, for example an ACORD schema. A rules profile, containing a carrier's rules for ACORD documents, is set up and stored in storage. A rules engine further validates a received ACORD document with the rules contained in the rules profile. For efficient coding, the rules engine uses a combination of a scripting language (Groovy—which is the standard scripting language for Java) and dot notation to describe exactly how the levels of the ACORD document are to be traversed, so that a single expression, which looks like a long variable name, is used to directly access the data in the document. Thus, no repeated programming idioms are required to access data items. A programmer simply writes a single long variable name that specifies exactly the data needed and makes that data available to use during validation.

BRIEF DESCRIPTION OF THE DRAWINGS

The following embodiment of the present invention is described by way of example only, with reference to the accompanying drawings, in which.

DETAILED DESCRIPTION

The following description explains a system to provide an efficient method to validate the compliance of ACORD documents with carriers' rules. The details of this explanation are offered to illustrate the present invention clearly. However, it will be apparent to those skilled in the art that the concepts of present invention are not limited to these specific details. Commonly known elements are also shown in block diagrams for clarity, as examples and not as limitations of the present invention.

Operating Environment

Figure 2:
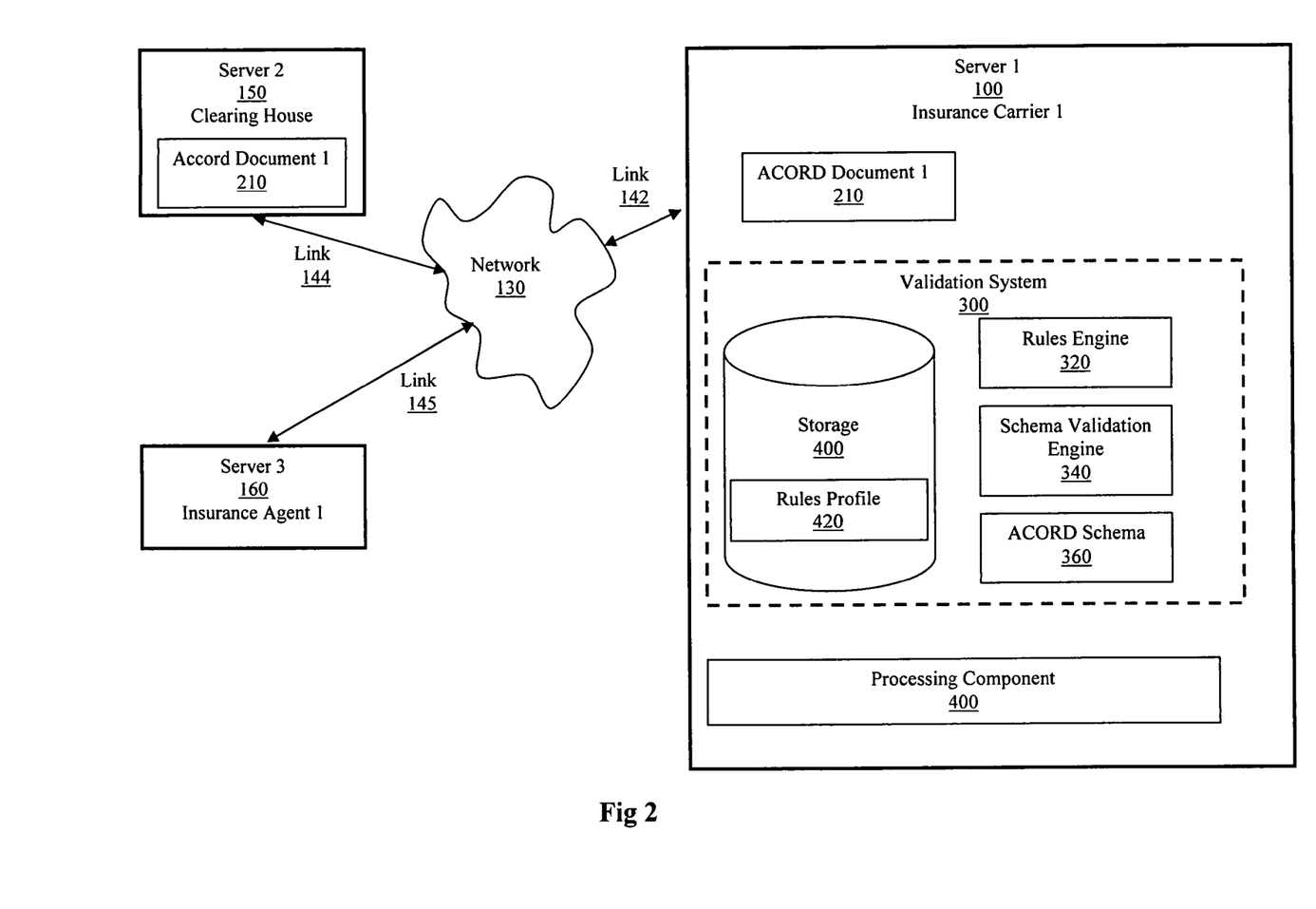
FIG. 2 is a block diagram showing an operating environment in which embodiments of the present invention may be employed.

An embodiment of the operating environment of the present invention is shown in FIG. 2. A party uses server 1 100 to operate an insurance carrier 1. Another party uses server 2 150 to operate a clearing house, and an insurance agent conducts business on server 3 160.

Server 100 can communicate with servers 150, and 160 via a wired or wireless link 142, a wired or wireless network 130, and wired or wireless links 144 and 145. The servers 100, 150 and 160 may be personal computers or larger computerized systems or combinations of systems.

The network 130 may be the Internet, a private LAN (Local Area Network), a wireless network, a TCP/IP (Transmission Control Protocol/Internet Protocol) network, or other communications system, and can comprise multiple elements such as gateways, routers, and switches. Links 142, 144, and 145 use technology appropriate for communications with network 130.

Through the operating environment shown in FIG. 2, an insurance carrier at server 1 100 can receive one or more ACORD documents 210 from the clearing house at server 2 150 or directly from the insurance agent at server 3 160.

Figure 3:
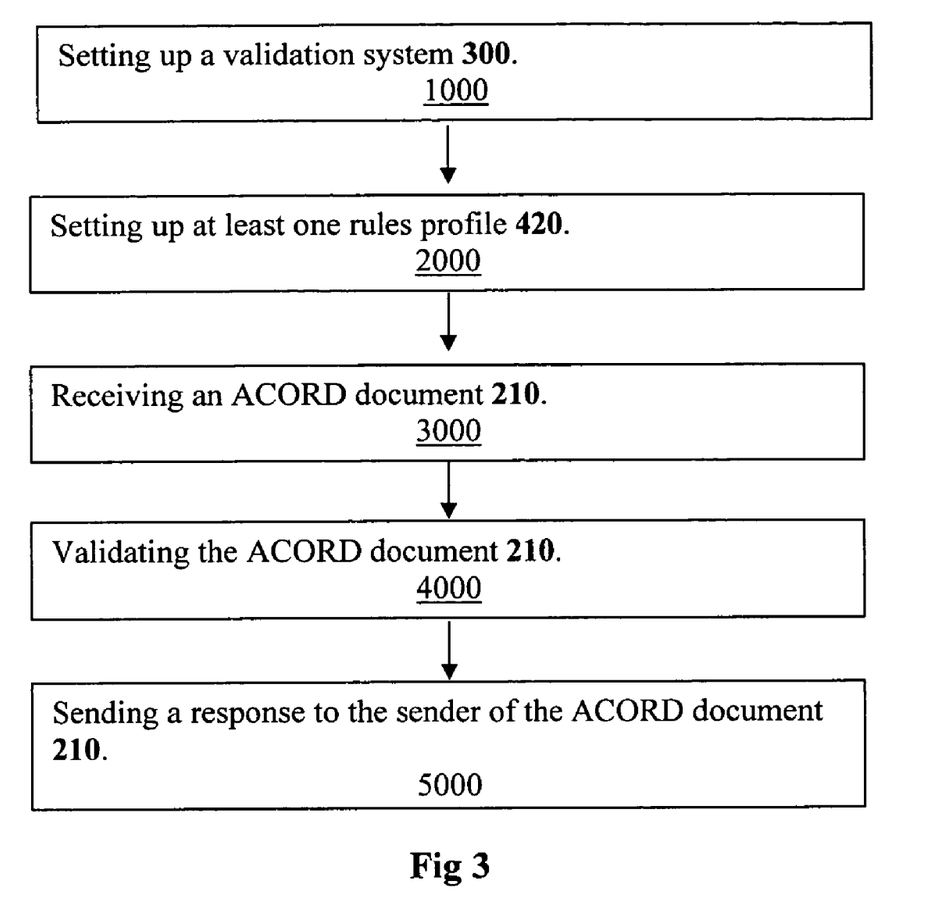
FIG. 3 is a flow chart showing a process for employing a validation system to validate ACORD documents.

FIG. 3 shows a process for employing a validation system 300 to validate ACORD documents 210, in an embodiment, through the following steps:

Step 1000 in FIG. 3—Setting up a validation system 300;

Step 2000 in FIG. 3—Setting up at least one rules profile 420;

Step 3000 in FIG. 3—Receiving an ACORD document 210;

Step 4000 in FIG. 3—Validating the ACORD document 210; and

Step 5000 in FIG. 3—Sending a response to the sender of the ACORD document 210.

Setting Up a Validation System

Figure 4:
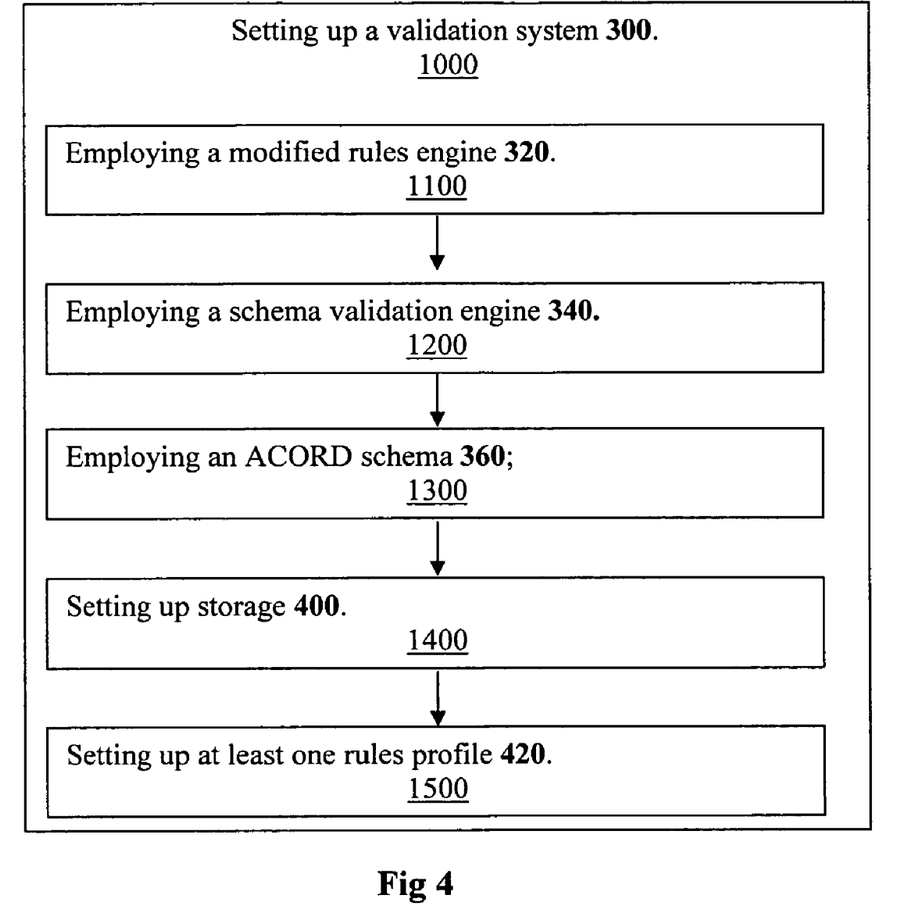
FIG. 4 is a flow chart showing a process for setting up a validation system.

A validation system 300, shown in FIG. 2, is a proprietary software program and supporting elements used to validate the compliance of one or more ACORD documents 210 with a carrier's rules. A party at server 100 sets up the validation system 300 on server 100. FIG. 4 shows a process, in an embodiment, for setting up a validation system 300:

Step 1100 in FIG. 4—Employing a Modified Rules Engine 320.

A rules engine 320 is a third-party software program used to analyze the content of an ACORD document 210 and to compare that content with carrier 1's rules profile 420. In an embodiment, the present invention incorporates into the rules engine 320 a more fitting and efficient method of coding for validation, explained in detail below.

Step 1200 in FIG. 4—Employing a Schema Validation Engine 340.

A schema validation engine 340 is a third-party software program used to analyze the content of an ACORD document 210 for compliance with an ACORD schema.

Step 1300 in FIG. 4—Employing an ACORD Schema 360.

An ACORD schema 360 is a file, downloadable over the internet that identifies the standards for the structure of an ACORD document and which will be stored.

Step 1400 in FIG. 4—Setting up Storage 400.

The storage 400 may comprise non-volatile storage used to store rules profiles 420;

Step 1500 in FIG. 4—Setting up at Least One Rules Profile 420;

In an embodiment, a party at server 100, shown in FIG. 2, sets up a rules profile 420, which is a file that indicates the insurance carrier's rules for an ACORD document 210.

Processing Component

A processing component 400, shown in FIG. 2, is software that processes one or more ACORD documents 210, for example by supplying requested information. For use with validation system 300, a party at server 100 may create a processing component 400 or employ one created elsewhere.

In other embodiments, the elements associated with validation system 300 may be located separately in more widely dispersed systems involving multiple servers.

In other embodiments, the present invention is equally applicable to XML documents that are not ACORD documents.

Modifying a Rules Engine

As mentioned in Step 1100 in FIG. 4, the present invention incorporates into a rules engine 320 a more fitting and efficient method of coding for validation.

In an embodiment, the present invention uses for the rules engine 320 a combination of a scripting language (Groovy—which the standard scripting language for Java) and dot notation to describe exactly how the levels of the ACORD document are to be traversed, so that a single expression (that looks like a long variable name) is used to directly access the data in the document.

No repeated programming idioms are required to access data items. A programmer simply writes a single long variable name that specifies exactly the data item needed and makes that data item available to use during validation. This is a better fit with the way rules are written, making developing and reading rules easier.

Example—Single Level Property

Consider the example XML fragment described above:

```
<XXX>
  <YYY>
    abc
  </YYY>
</XXX>
```

In this example, rather than creating and repeating a Java expression, a programmer would simply use the following code:

doc.YYY.text( )

where "doe" is a variable representing a complete or partial XML document. In this example, the document relates to object XXX; a property YYY is associated with the object XXX, and the "text( )" is a string abc associated with the property YYY.

Then, the programmer can write a validation rule such as the following:

```
<rule name="Policy Number Too Long">
  <parameter identifier="doc">
    <groovy:class>com.webify.OurGroovyObject</groovy:class>
  </parameter>
  <groovy:condition>doc.YYY.text( ).length( )>
      7</groovy:condition>
  <groovy:consequence>
      System.out.println("Policy:"+doc.YYY.text( ))
      drools.assertObject(new com.webify.ValidationError
          ("TOO_LONG"))
  </groovy:consequence>
</rule>
```

Such a validation rule is much easier to read by itself than when it must be preceded by the four lines of idiom or the subroutine call discussed earlier.

The Groovy API provides for a programmatic way that Java classes can control whenever a Groovy script uses dot notation. A Java object that implements the GroovyObject interface is placed into the Groovy context. Whenever a script refers to X.Y (where X is the name of the object in Groovy), Groovy will invoke the method "getProperty" on the object, passing the String "Y" as a parameter. As long as that method returns another implementation of a GroovyObject, the programmer can then use another dot on that object to go further.

Therefore, to implement this solution, a class is created that implements the GroovyObject interface and wraps a DOM Node object. The getProperty method takes the passed in String (which is the name specified after the dot in the Groovy script) and runs getElementsByTagName against the wrapped Node (if it is an Element). If one Element is returned, then it just creates a new instance of the wrapper class that wraps the single item found and returns it. Then to start things, off, a wrapper for the top-level DOM object is put into the Groovy context.

In addition, in the "invokeMethod" method of this class, there is a check to see whether the method being invoked is "text". If it is, the method gets the child of the wrapped Node and returns its value directly as a String, without wrapping it. This allows the "text( )" method to be invoked in the script, and since the return is a String, String class methods can be invoked directly against the result.

The following is an example of what happens behind the scenes when the pseudo-variable "a.b.c.text( )" is referred to within a script:

The method "getProperty" is invoked on GroovyObject a, passing the string "b". It returns a new GroovyObject that wraps Node "b".

The method "getProperty" is invoked on GroovyObject b, passing the string "c". It returns a new GroovyObject that wraps Node "c".

The method "invokeMethod" is invoked on GroovyObject c, passing the string "text". It returns the String containing the text node value of the child underneath Node "c".

Example—Multiple Level Property

For example, consider the following XML fragment:

```
<XXX>
  <YYY>
```

```
        <ZZZ>
            abc
        </ZZZ>
    </YYY>
</XXX>
```

In this example, a programmer would simply use the following code:

doc.YYY.ZZZ.text( )

where "doc" is a variable representing a complete or partial XML document. In this example, the document relates to object XXX; a property YYY is associated with the object XXX; a property ZZZ is associated with the property YYY; and the "text( )" is a string abc associated with the property ZZZ.

The validation rule for this example is similar to the previous example:

```
<rule name="Policy Number Too Long">
    <parameter identifier="doc">
        <groovy:class>com.webify.OurGroovyObject</groovy:class>
    </parameter>
    <groovy:condition>doc.YYY.ZZZ.text( ).length( )>7</groovy:condition>
    <groovy:consequence>
        System.out.println("Policy:"+doc.YYY.ZZZ.text( ))
        drools.assertObject(new com.webify.ValidationError("TOO_LONG"))
    </groovy:consequence>
</rule>
```

Using a Validation System

After server 1 100, shown in FIG. 2, receives an ACORD document 210 from the clearing house at server 2 150, the validation system 300 automatically validates the compliance of the ACORD document 210 with a carrier's rules, as mentioned in Step 4000 in FIG. 3.

Figure 5:
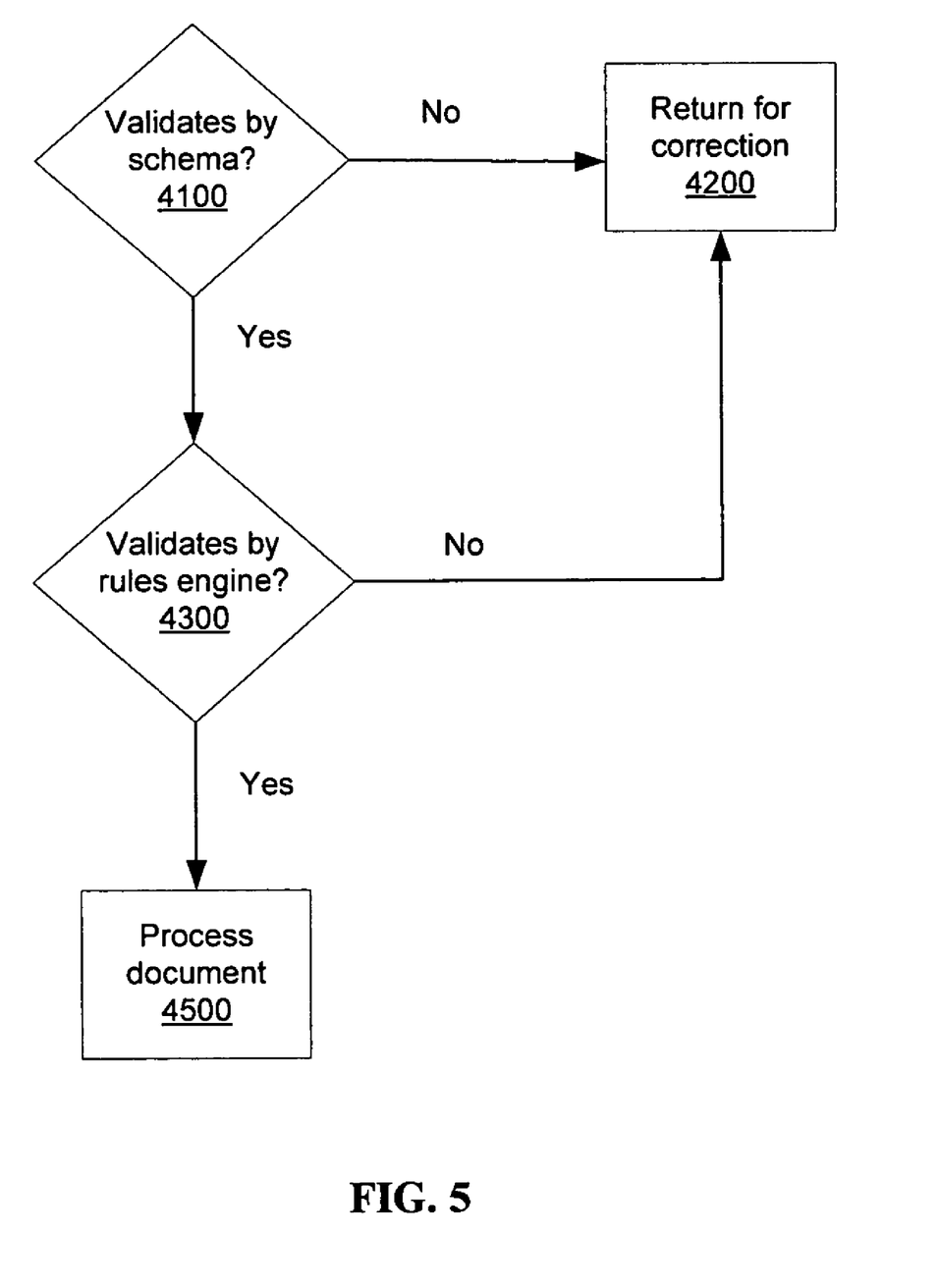
FIG. 5 is a flow chart showing a process of validation.

An embodiment of this process for validating the ACORD document 210 is shown in FIG. 5.

Step 4100 in FIG. 5—Validates by Schema?

The validation system 300, shown in FIG. 2, automatically uses the schema validation engine 340 to compare the ACORD document 210 with the ACORD schema 360 to validate the general structure of the data in the ACORD document 210.

Step 4200—Return for Correction.

If the answer is no because ACORD document 210 fails this schema validation, the validation system 300, shown in FIG. 2, sends ACORD document 210 back to the clearing house at server 2 150 for error-correction and resubmission.

Step 4300—Validates by Rules Engine?

If the answer is yes because ACORD document 210 passes this validation, validation system 300, shown in FIG. 2, employs the rules engine 320, which incorporates the more efficient coding system described above, to validate ACORD document 210 with the rules supplied in the carrier's rules profile 420.

For example, a carrier may require that a policy's identification number contain no more than seven digits, as explained above. In this case, the validation system 300 will determine whether the policy's identification number in the ACORD document 210 contains no more than seven digits.

Step 4200—Return for Correction.

If ACORD document 210 fails this rules engine validation, validation system 300, shown in FIG. 2, sends ACORD document 210 back to the clearing house at server 2 150 for error-correction and resubmission.

Step 4500—Process Document.

If ACORD document 210 passes this rules engine validation, validation system 300, shown in FIG. 2, sends ACORD document 210 to its processing component 400 for processing.

For example, if the ACORD document 210 comprises a request for the rate for insurance coverage for a potential client with certain characteristics, the processing component 400 processes the request and sends an answering message containing the requested information to the clearing house at server 2 150.

Computer System Overview

Figure 6:
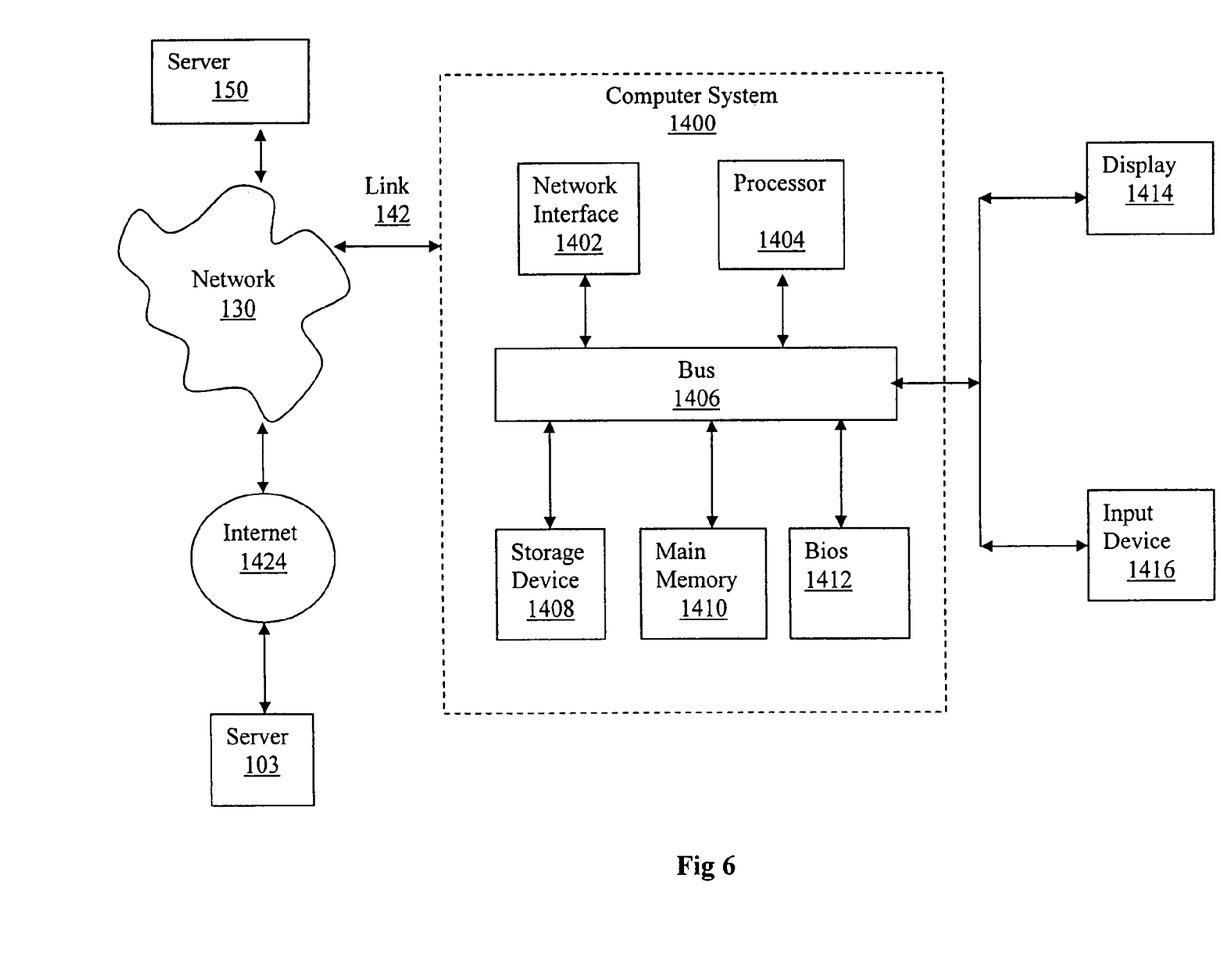
FIG. 6 is a block diagram that illustrates a typical computer system, representing a server on which embodiments of the present invention can be implemented.

FIG. 6 is a block diagram that illustrates a typical computer system 1400, well known to those skilled in the art, representing a server 100, shown in FIG. 2, on which embodiments of the present invention can be implemented. This computer system 1400, shown in FIG. 6, comprises a network interface 1402 that provides two-way communications through a wired or wireless link 142 to a wired or wireless communications network 130 that uses any applicable communications technology. For example, the network 130 can comprise a public telephone network, a wireless network, a local area network (LAN), and any known or not-yet-know applicable communications technologies, using correspondingly applicable links. The network 130 in turn provides communications with one or more host computers 150 and, through the Internet 1424, with one or more servers 103.

The network interface 1402 is attached to a bus 1406 or other means of communicating information. Also attached to the bus 1406 are the following:

- a processor 1404 for processing information;
- a storage device 1408, such as an optical disc, a magneto-optical disc, or a magnet disc, for storing information and instructions;
- main memory 1410, which is a dynamic storage device such as a random access memory (RAM) that stores information and instructions to be carried out by processor 1404;
- a bios 1412 or another form of static memory such as read only memory (ROM), for storing static information and instructions to be carried out by processor 1404;
- a display 1414, such as a liquid crystal display (LDC) or cathode ray tube (CRT) for displaying information to user of the computer system 1400; and
- an input device 1416, with numeric and alphanumeric keys for communicating information and commands to processor 1404. In another embodiment a mouse or other input devices can also be used.

The computer system 1400 is used to implement the methods of the present invention in one embodiment. However, embodiments of the present invention are not limited to specific software and hardware configurations. Computer system 1400 can receive data from computer 150 and server 103 through a network 130 such as the Internet, and appropriate links 142, such as wired or wireless ones, and its network interface 1402. It can of course transmit data back to computers over the same routes.

Computer system 1400 carries out the methods of the present invention when its processor 1404 processes instructions contained in its main memory 1410. Another computer-readable medium, such as its storage device 1408, may read these instructions into main memory 1410 and may do so after receiving these instructions through network interface 1402. Processor 1404 further processes data according to instructions contained in its storage device 1408.

Data is relayed to appropriate elements in computer system 1400 through its bus 1406. Instructions for computer system 1400 can also be given through its input device 1416 and display 1414.

"Computer-readable medium" refers to any medium that provides instructions to processor 1404, comprising volatile and non-volatile media. Volatile media comprise dynamic memory, such as main memory 1410. Non-volatile media comprise magnetic, magneto-optical, and optical discs, such as storage device 1408. Typical examples of widely used computer-readable media are floppy discs, hard discs, magnetic tape, CD-ROMs, punch cards, RAM, EPROMs, FLASH EPROMs, memory cards, chips, and cartridges. Multiple computer-readable media may be used, known and not yet known, can be used, individually and in combinations, in different embodiments of the present invention.

Alternate Embodiments

It will be apparent to those skilled in the art that different embodiments of the present invention may employ a wide range of possible hardware and of software techniques. For example the communication between servers could take place through any number of links, including wired, wireless, infrared, or radio ones, and through other communication networks beside those cited, including any not yet in existence.

Also, the term computer is used here in its broadest sense to include personal computers, laptops, telephones with computer capabilities, personal data assistants (PDAs) and servers, and it should be recognized that it could include multiple servers, with storage and software functions divided among the servers. A wide array of operating systems, compatible e-mail services, Web browsers and other communications systems can be used to transmit messages among servers.

Furthermore, in the previous description the order of processes, their numbered sequences, and their labels are presented for clarity of illustration and not as limitations on the present invention.

What is claimed is:

1. A method for validating an insurance industry XML document according to compliance rules governing the structure and content of XML documents comprising:
    setting up at least one rules profile that indicates rules for validating the content of XML documents that are of a corresponding XML document type;
    receiving at least one XML document of the corresponding XML document type from at least one provider server; and
    processing each received XML document on a server computer by:
        using a schema validation engine to analyze the structure of a received XML document for compliance against a predetermined XML schema associated with the corresponding XML document type;
        determining whether the structure of the received XML document passes compliance by the schema validation engine;
        returning the received XML document to the associated provider server if the structure of the received XML document fails compliance;
        using a rules engine, if the structure of the received XML document passes compliance by the schema validation engine, to validate the content of the received XML document with the rules contained in the rules profile, the rules engine comprising a combination of a scripting language and dot notation to describe how the levels of the XML are to be traversed, so that a single expression is used to directly access the data in the document;
        determining whether the content of the received XML document passes compliance by the rules engine;
        returning the received XML document to the associated provider server if the content of the received XML document fails compliance; and
        forwarding the received XML document for further processing if the content and the structure of the received XML document pass compliance, as determined from both the schema validation engine and the rules engine.

2. The method of claim 1 further comprising storing at least one rules profile in a metadata storage comprising non-volatile storage, the at least one rules profile specifying the rules governing the structure and content of an XML document that at least one party requires for processing the XML document.

3. The method of claim 1 wherein the dot notation is in the form doc.YYY.text( ), where doc is a variable representing a complete or partial XML document, and where YYY is the name of a child element of the XML document.

4. The method of claim 1 wherein the scripting language comprises a scripting language based upon a computer architecture independent programming language.

5. The method of claim 1 wherein the scripting language is an object oriented scripting language.

6. The method of claim 1 wherein the insurance industry XML document further comprises a document in accordance with an industry standardized schema.

7. The method of claim 6 wherein the schema validation engine further analyzes the content of an industry standardized document for compliance with an industry standardized schema.

8. The method of claim 6 wherein the predetermined XML schema identifies the standards for the structure of an industry standardized document.

9. The method of claim 6 wherein the rules profile further specifies a plurality of rules governing the structure and content of an industry standardized document that at least one party requires for processing the industry standardized document.

10. A method for validating an industry standardized document according to compliance rules governing the structure and content of industry standardized documents comprising:
    setting up at least one rules profile that indicates rules for validating the content of industry standardized documents that are of a corresponding industry standardized document type;
    receiving at least one industry standardized document of the corresponding industry standardized document type from at least one provider server; and
    processing each received industry standardized document on a server computer by:
        using a schema validation engine to analyze the structure of a received industry standardized document for compliance against a predetermined industry standardized schema associated with the corresponding industry standardized document type;
        determining whether the structure of the received industry standardized document passes compliance by the schema validation engine;

returning the received industry standardized document to the associated provider server if the structure of the received industry standardized document fails compliance;

using a rules engine, if the structure of the received industry standardized document passes compliance by the schema validation engine, to validate the content of the received industry standardized document with the rules contained in the rules profile, the rules engine comprising a combination of a scripting language and dot notation to describe how the levels of the industry standardized document are to be traversed, so that a single expression is used to directly access the data in the document;

determining whether the content of the received industry standardized document passes compliance by the rules engine;

returning the received industry standardized document to the associated provider server if the content of the received industry standardized document fails compliance; and forwarding the received industry standardized document for further processing if the content and the structure of the received industry standardized document pass compliance, as determined from both the schema validation engine and the rules engine.

11. The method of claim 10 further comprising storing at least one rules profile in a metadata storage comprising non-volatile storage, the at least one rules profile specifying the rules governing the structure and content of an industry standardized document that at least one party requires for processing the industry standardized document.

12. The method of claim 10 wherein the dot notation is in the form doc.YYY.text( ), where doc is a variable representing a complete or partial industry standardized document, and where YYY is the name of a child element of the industry standardized document.

13. The method of claim 10 wherein the scripting language comprises a scripting language based upon a computer architecture independent programming language.

14. The method of claim 10 wherein the scripting language is an object oriented scripting language.

15. A computer program product that validates an insurance industry XML document according to compliance rules governing the structure and content of XML documents comprising:

a computer usable storage medium having computer usable program code embodied therewith, the computer usable program code comprising:

computer usable program code configured to set up at least one rules profile that indicates rules for validating the content of XML documents that are of a corresponding XML document type;

computer usable program code configured to receive at least one XML document of the corresponding XML document type from at least one provider server;

computer usable program code configured process each received XML document on a server computer comprising:

computer usable program code configured to use a schema validation engine to analyze the structure of a received XML document for compliance against a predetermined XML schema associated with the corresponding XML document type;

computer usable program code configured to determine whether the structure of the received XML document passes compliance by the schema validation engine;

computer usable program code configured to return the received XML document to the associated provider server if the structure of the received XML document fails compliance;

computer usable program code configured to use a rules engine, if the structure of the received XML document passes compliance by the schema validation engine, to validate the content of the received XML document with the rules contained in the rules profile, the rules engine comprising a combination of a scripting language and dot notation to describe how the levels of the XML are to be traversed, so that a single expression is used to directly access the data in the document;

computer usable program code configured to determine whether the content of the received XML document passes compliance by the rules engine;

computer usable program code configured to return the received XML document to the associated provider server if the content of the received XML document fails compliance; and computer usable program code configured to forward the received XML document for further processing if the content and the structure of the received XML document pass compliance, as determined from both the schema validation engine and the rules engine.

16. The computer program product of claim 15 further comprising computer usable program code configured to store at least one rules profile in a metadata storage comprising non-volatile storage, the at least one rules profile specifying the rules governing the structure and content of an XML document that at least one party requires for processing the XML document.

17. The computer program product of claim 15 wherein the dot notation is in the form doc.YYY.text( ), where doc is a variable representing a complete or partial XML document and where YYY is the name of a child element of the XML document.

18. The computer program product of claim 15 wherein the scripting language comprises a scripting language based upon a computer architecture independent programming language.

19. The computer program product of claim 15 wherein the scripting language is an object oriented scripting language.

20. The computer program product of claim 15 wherein the insurance industry XML document further comprises a document in accordance with an industry standardized schema.

* * * * *